United States Patent [19]

Burnham et al.

[11] Patent Number: 5,349,476
[45] Date of Patent: Sep. 20, 1994

[54] CONTROL FOR OPTICAL SYSTEM HAVING MULTIPLE FOCAL LENGTHS

[75] Inventors: William L. Burnham, Leroy; Ralph M. Lyon, Rochester; Michael J. Poccia, Penfield, all of N.Y.

[73] Assignee: Eastman Kodak Company, Rochester, N.Y.

[21] Appl. No.: 24,132

[22] Filed: Mar. 1, 1993

[51] Int. Cl.⁵ .................. G02B 15/14; G02B 7/02; G02B 27/64
[52] U.S. Cl. .................. 359/699; 359/557; 359/683; 359/823
[58] Field of Search .................. 359/698–699, 359/700, 696, 697, 813, 823, 676, 689, 686, 674, 691, 554–557, 683; 354/195.12, 195.10, 400

[56] References Cited

U.S. PATENT DOCUMENTS

| | | | |
|---|---|---|---|
| 1,998,367 | 1/1935 | Wenczler | 88/24 |
| 3,051,048 | 8/1962 | Mahn | 88/57 |
| 3,480,349 | 11/1969 | Himmelsbach | 359/699 |
| 3,533,344 | 10/1970 | Thomas | 359/699 |
| 3,550,518 | 12/1970 | Himmelsbach | 359/699 |
| 4,391,496 | 7/1983 | Schilling et al. | 359/376 |
| 4,757,372 | 7/1988 | Betensky et al. | 354/201 |
| 4,971,427 | 11/1990 | Takamura et al. | 359/700 |
| 4,980,771 | 12/1990 | Komatsuzaki et al. | 354/195.1 |
| 5,000,549 | 3/1991 | Yamazaki | 359/676 |

Primary Examiner—Loha Ben
Assistant Examiner—Thong Nguyen
Attorney, Agent, or Firm—David A. Hawley

[57] ABSTRACT

An optical system including first and second lens groups disposed for relative movement along an optical axis and coupled together by a cam and follower mechanism for controlling such relative movement to change the focal length of the optical system. The system is characterized by a mechanism for offsetting relative movement between the lens groups along the optical axis caused by lateral movement of the lens groups essentially normal to the axis, thereby to maintain the focal length constant in the presence of the lateral movement.

10 Claims, 5 Drawing Sheets

CONTROL FOR OPTICAL SYSTEM HAVING MULTIPLE FOCAL LENGTHS

CROSS-REFERENCE TO RELATED APPLICATION

Reference is made to commonly assigned U.S. patent application Ser. No. 08/024,033, filed concurrently herewith in the name of Peter Labaziewicz and entitled "OPTICAL APPARATUS FOR CHANGING FOCUS AND FOCAL LENGTH."

FIELD OF THE INVENTION

The invention relates to the field of photography and more specifically to an optical system having a plurality of optical elements moveable under the influence of control apparatus to provide multiple focal lengths.

BACKGROUND OF THE INVENTION

Modern cameras frequently include optical systems, sometimes called zoom lenses, having multiple or infinitely variable focal lengths ranging from wide-angle to telephoto. It is common in such systems to include groups of optical elements that are moveable relative to each other along the optical axis to change the focal length. It is desirable at the same time to maintain focus throughout the entire range of focal lengths. This usually is accomplished by moving the optical elements relative to the film or other imaging plane.

There are many techniques for controlling movement of the optical elements in a zoom lens system to maintain focus while changing focal length. One such technique is illustrated in U.S. Pat. No. 4,971,427, filed in the name of Takamara et al. and issued Nov. 20, 1990. The Takamara et al. patent discloses a camera having front and back lens groups and a bell crank coupled therebetween to vary the inter-group spacing and thereby change the focal length. Both lens groups are retained in a lens barrel that is movable along an optical axis relative to the film plane. Movement of the lens barrel causes the bell crank to engage and follow a cam plate that rotates the bell crank and shifts the back lens group along the optical axis relative to the front lens group.

Another technique is disclosed in U.S. Pat. No. 4,391,496, filed in the name of Schilling et al. and issued Jul. 5, 1983. According to the Shilling disclosure, an elbow linkage couples first and second lens groups in a pancratic objective system. The linkage includes a cam follower at the elbow for engaging and following a cam surface so that axial movement of the first lens group extends or contracts the linkage, changing the distance between the lens groups and thereby the system focus.

PROBLEM TO BE SOLVED BY THE INVENTION

Optical systems that employ cams and followers, such as those described above, are particularly sensitive to design and manufacturing tolerances that permit lateral movement of the lens groups relative to the cam surface. Such movement is translated by the cam and linkage into undesirable changes in focal length. Minor movement of the lens groups perpendicular to the optical axis can increase or decrease the distance between the lens groups with a significant impact on focal length and a detrimental shift in focus from that desired for the resulting focal length. This may degrade the image at the film plane.

SUMMARY OF THE INVENTION

The present invention is directed to an optical system including a plurality of optical elements disposed along an optical axis, and means for moving the elements along the axis thereby to vary the focal length of the system. The optical system is characterized by compensating means for maintaining the focal length constant upon lateral displacement of the optical elements in a direction substantially perpendicular to the axis. The compensating means permits relaxation of manufacturing tolerances pertaining to the lateral position of the elements.

In accordance with one aspect of the invention the optical system is a zoom lens having first and second optical groups moveable along an optical axis. The first and second groups are coupled together by a cam and follower mechanism for displacing the second lens group relative to the first lens group in response to movement of the first group along the optical axis, thereby controlling the inter group spacing and providing infinitely variable focal lengths. This aspect of the invention is characterized by a follower mechanism including first and second links that move equally in opposite directions relative to each other to maintain a chosen focal length constant when the optical elements are displaced laterally in a direction substantially perpendicular to the optical axis.

These and other aspects, objects, features and advantages of the invention will be more clearly understood and appreciated from a review of the following detailed description of the preferred embodiments and appended claims, and be reference to the accompanying drawings.

BRIEF DESCRIPTION OF THE DRAWINGS

The invention and its many advantages will become apparent from the following description taken in connection with the accompanying drawings, wherein.

DESCRIPTION OF PREFERRED EMBODIMENT

The invention is disclosed in connection with a conventional photographic still camera. Because such cameras are well known, this description is directed in particular to elements forming part of or cooperating directly with the disclosed embodiment.

Figure 1:
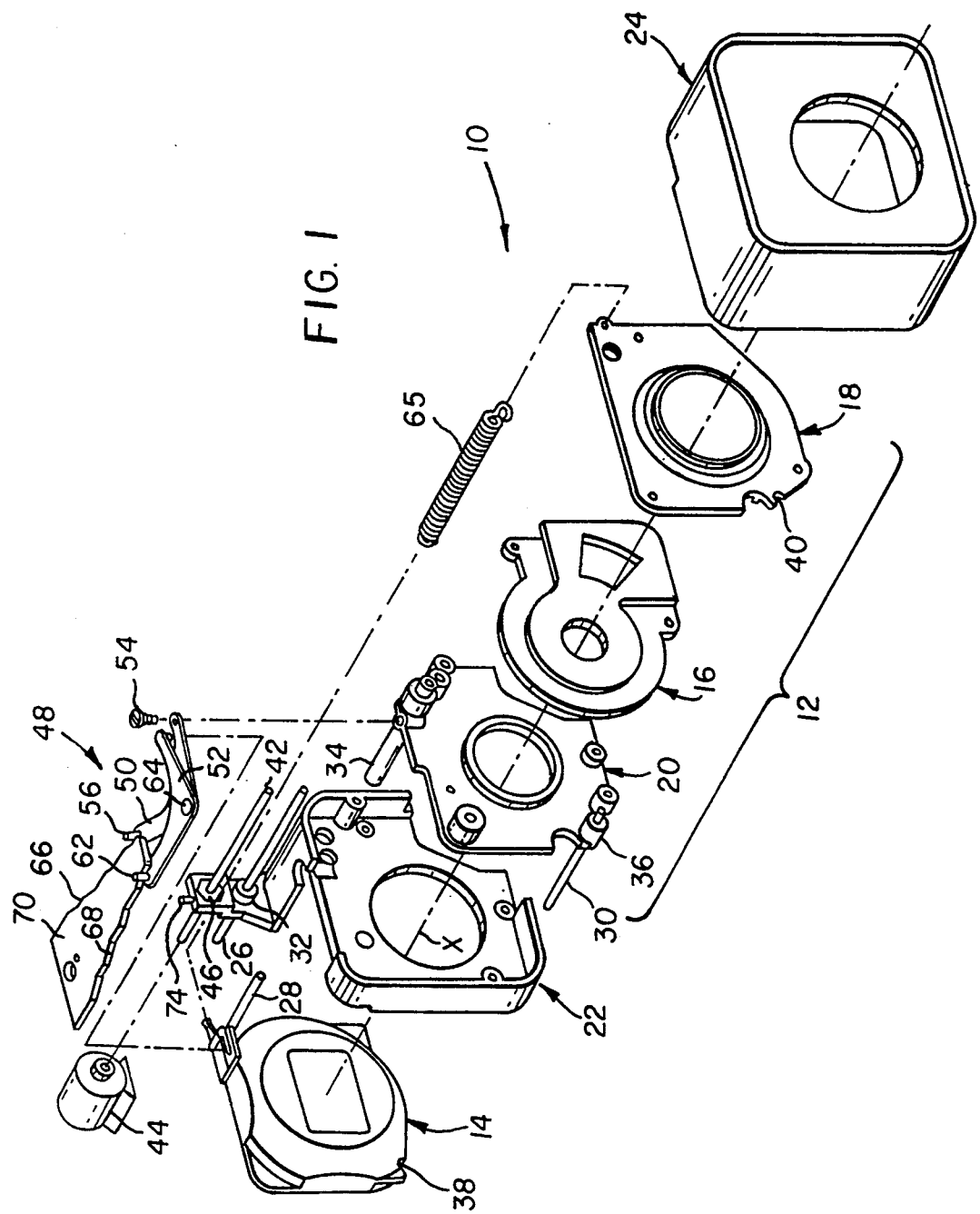
FIG. 1 is an exploded view of a zoom lens system depicting first and second lens groups coupled by means that compensate for lateral movement in accordance with the present invention.
Figure 2:
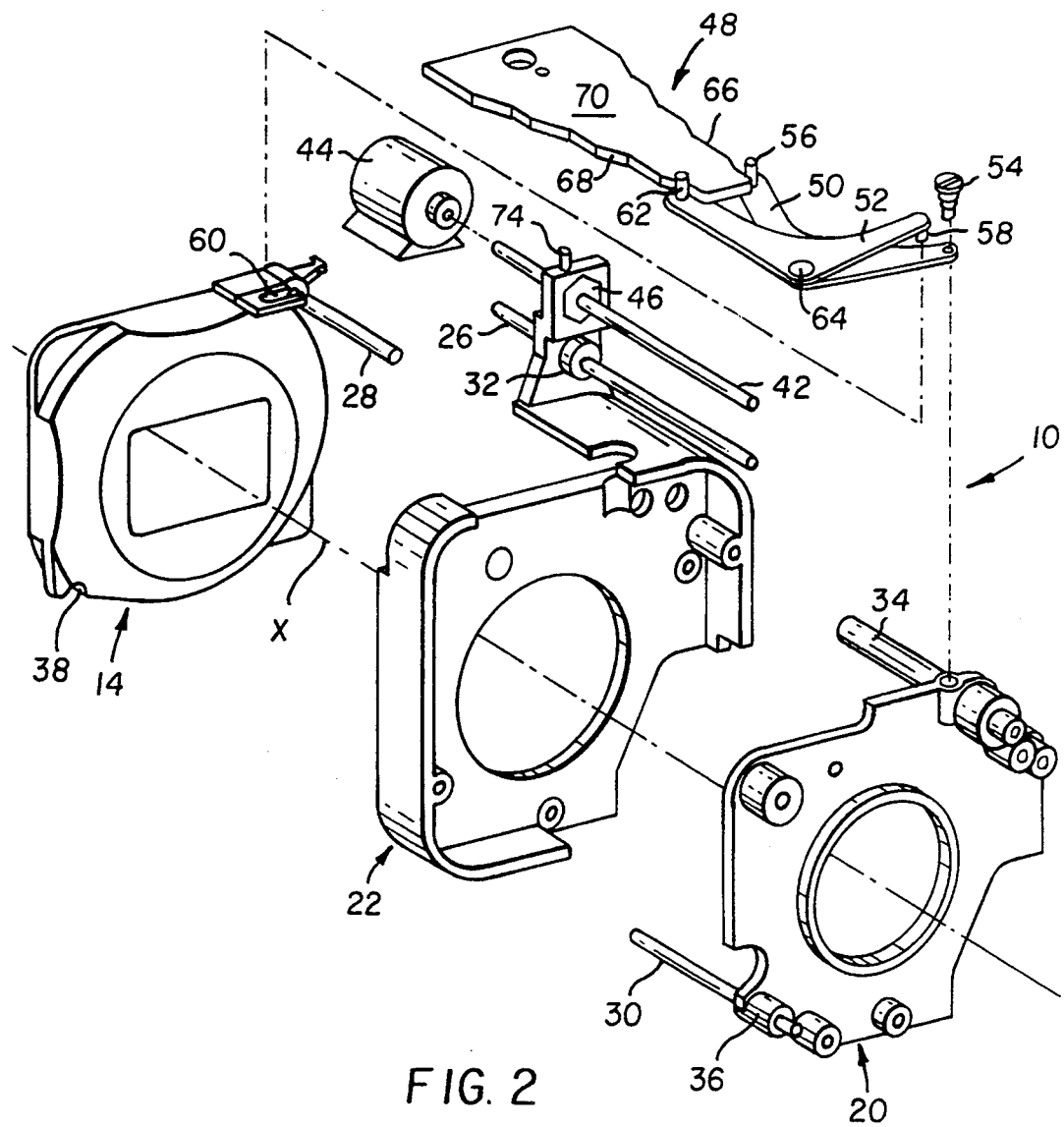
FIG. 2 is an exploded view of a portion of the zoom lens system of FIG. 1, enlarged to more clearly show the first and second lens groups and the coupling means.
Figure 3:
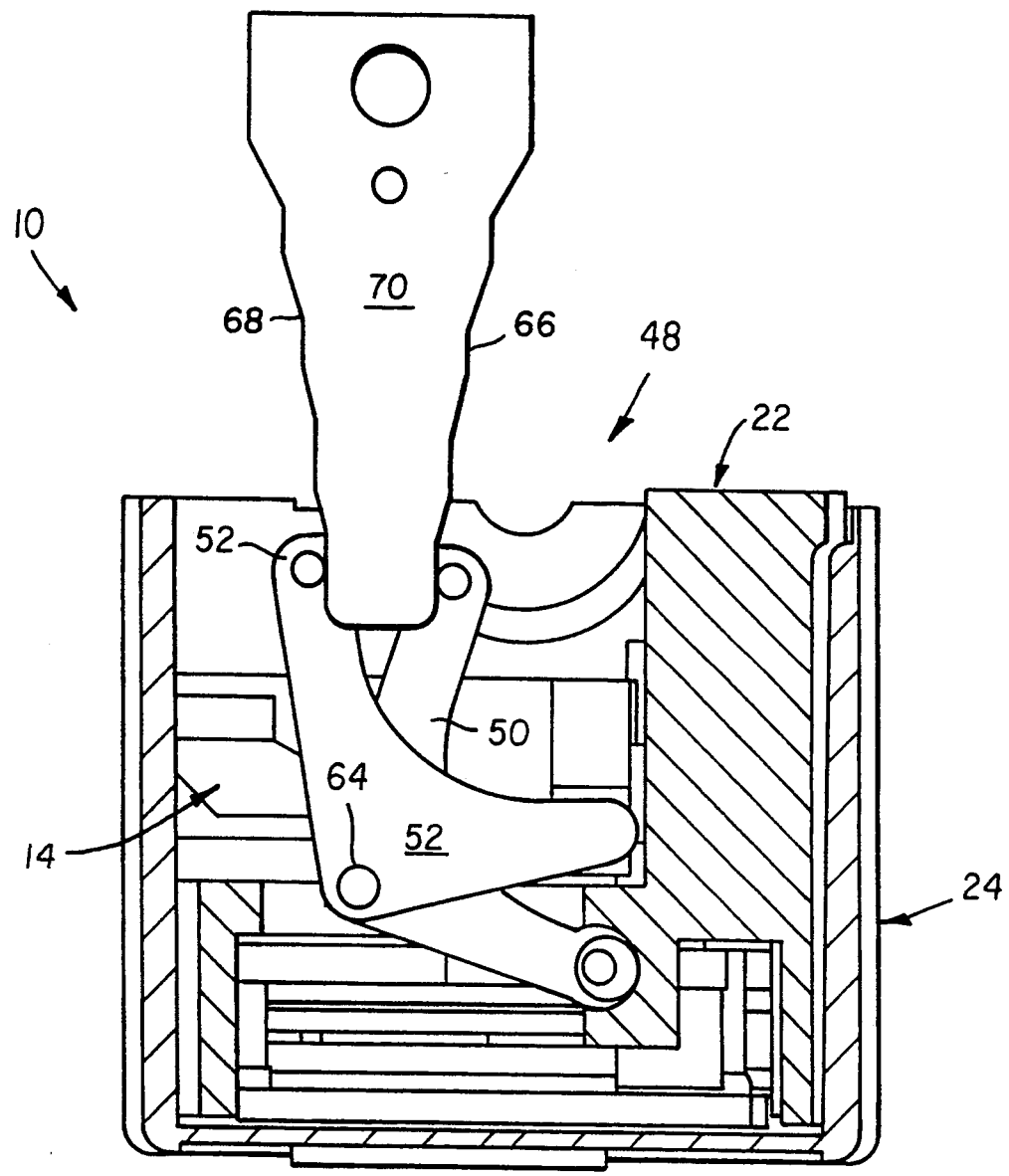
FIG. 3 is a top plan view of the first and second lens groups and the coupling means.

Referring now to FIGS. 1 and 2, an optical system in the form of a zoom lens 10 is depicted including first or front and second or back lens groups 12 and 14, respectively, disposed for relative movement along an optical axis X. The front lens group 12 includes a shutter assembly 16, of conventional design, a front lens retainer 18 and a rear lens retainer 20, which are all assembled within a lens housing 22 and lens cover or barrel 24 to move as a group along the optical axis. It will be obvious to one skilled in the art that the first and second lens groups 12 and 14 can include any number of appropriate combinations of lens elements interposed with shutter and other assemblies suitable for photographic exposures. It also will be apparent that other stationary and moveable groups of optical and related elements can be provided in cooperation with the first and second groups 12 and 14 along the same optical axis.

The first and second lens groups are maintained in alignment perpendicular to the film plane, are prevented from rotating, and are mounted for lengthwise movement along the optical axis by a plurality of parallel guide rods and anti-rotation shafts 26, 28, and 30. Main shaft 26 is secured to the camera body (not shown), and extends through a bushing 32 in housing 22 for aligning the first lens group 12 relative to the camera body and film plane (not shown). Shaft 28 extends from the second lens group 14 through an aperture in housing 22 and into a sleeve 34 in the first lens group 12 for maintaining proper alignment of the second lens group 14 relative to the first lens group 12. Shaft 30 extends from a boss 36 in the first lens group 12 through the housing 22 and against a notch 38 in the second lens group 14 to prevent rotation of the second lens group 14 relative to the first lens group 12. The end of the anti-rotation shaft adjacent retainer 18 is accommodated by a notch 40 in the retainer.

Longitudinal movement of the first lens group 12 along the optical axis X is provided through a drive shaft 42 under control of a motor 44. The drive shaft is coupled to housing 22 through a threaded nut 46 that translates rotary movement of the drive shaft into longitudinal movement of the housing and the first lens group assembled therewith. The second lens group 14, on the other hand, is moveable independently of the first lens group along shafts 28 and 30.

The focal length of the optical system is varied by control 48 coupled between the first and second lens groups 12 and 14. Control 48 translates longitudinal movement of the first lens group into movement of the second lens group in the same direction but different amount, thereby changing the distance between the lens groups and the focal length of the optical system. In accordance with the preferred embodiment, control 48 includes first and second linkages in the form of L-shaped members 50 and 52. The first link 50 includes one end pivotally coupled to the front lens group 12 through a pin 54, and another end having a cam follower in the form of a pin 56. The second L-shaped member 52 is coupled to the second lens group 14 through a pin 58 and slot 60 (FIG. 2), permitting translational movement there between. Another end of L-shaped member 52 includes a cam follower in the form of a pin 62. The first and second L-shaped members form a scissors linkage coupled in their center sections by a floating pivot 64.

The cam followers 56 and 62 are urged under the influence of spring 65 (FIG. 1) into engagement with first and second substantially identical but opposed cam surfaces 66 and 68, respectively, of a single cam plate 70. This cam and follower mechanism, in cooperation with the linkages 52 and 54, controls a number of important optical functions. As already mentioned above, it is this cam and follower mechanism that translates longitudinal movement of the first lens group into movement of the second lens group in the same direction but different amount, thereby changing the focal length of the optical system while maintaining optimal focus throughout the range of focal lengths. On closer inspection it will be noted that this same cam and follower mechanism also compensates for lateral movement of the first and second lens groups, that might result, for example, from relaxed manufacturing tolerances. Lateral movement of one or both lens groups substantially normal to the optical axis will cause equal but opposite movement of the linkages, cancelling the effect and maintaining the focal length constant. This compensating movement is a valuable aid for maintaining the focal length of a zoom lens system constant at any particular position of focus. The simplicity of a cam and follower arrangement is retained while removing the prior art requirement of relatively precise tolerances.

Figure 4:
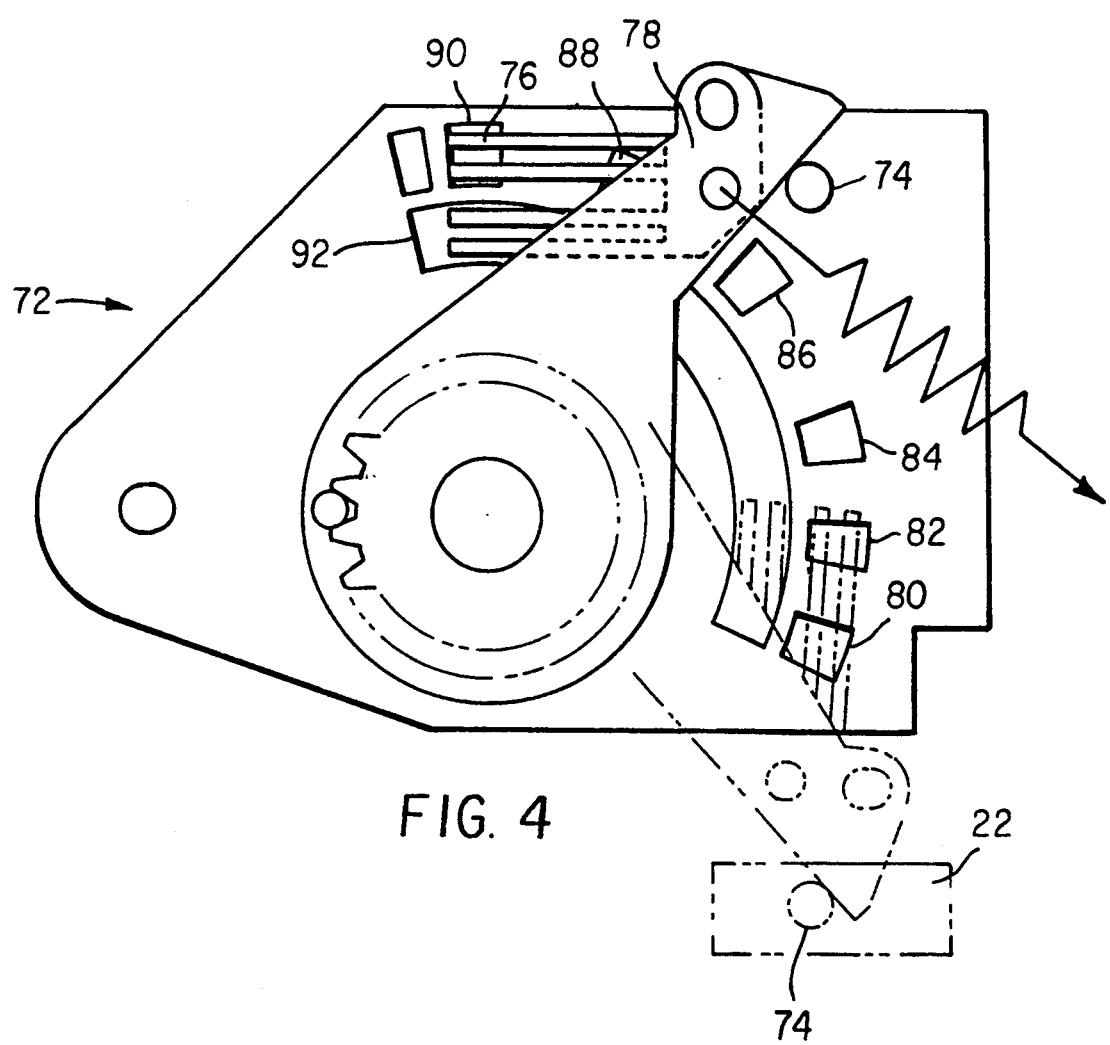
FIG. 4 is a bottom plan view of a switch control assembly for use with the present invention depicting a position switch in a wide-angle position and, in phantom, a telephoto position.

Referring now to FIG. 4, a switch control assembly 72 is depicted for use with the present invention to sense and control the relative position of the first lens group 12 as it moves between a wide-angle position, depicted in solid lines in FIG. 4, and a telephoto position, depicted in phantom in FIG. 4. A pin 74, carried by housing 22 moves with the first lens group 12 during changes in its position along optical axis X. During such movement the pin engages and sweeps contacts 76, on pivotal arm 78, across a plurality of switch pads 80, 82, 84, 86, 88, and 90, for establishing electrical connections between such switch pads and a grounding strip 92. Each switch pad represents a desired position along the optical axis of the first lens group and cooperates with appropriate electrical mechanisms in the camera body (not shown) and motor 44 to establish the first lens group in such desired positions.

DESCRIPTION OF ALTERNATIVE EMBODIMENTS

Figure 5:
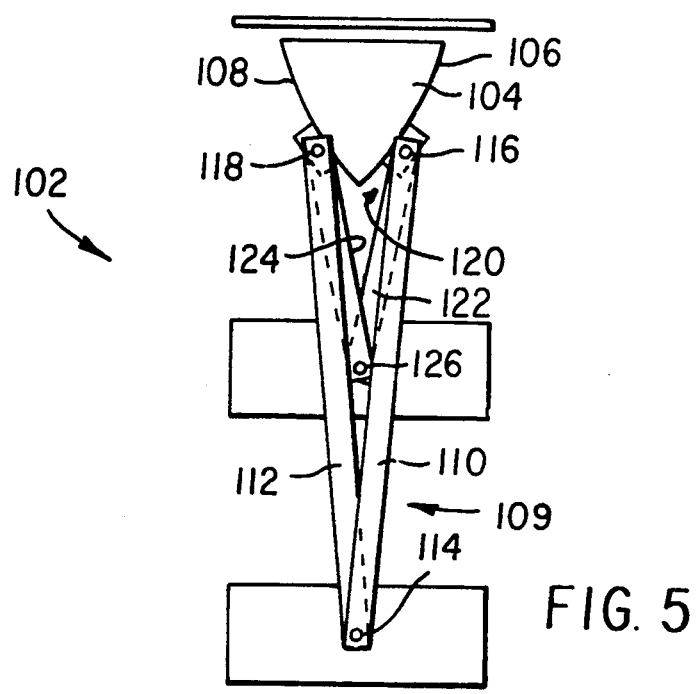
FIG. 5 is a schematic representation of a first alternate embodiment of control apparatus embodying the present invention; and, FIG. 6 is a schematic representation of a second alternative embodiment of control apparatus embodying the present invention.

FIG. 5 depicts an alternate embodiment of the invention including a control 102 wherein the cam 104 is a single plate defining first and second cam surfaces 106, and 108, that are essentially mirror images of each other on opposite edges of the cam plate. A first cam follower 109 includes two links 110 and 112 arranged in a "V" configuration with its apex pivotally coupled to the first lens group at 114 and its terminal ends 116 and 118 engaging and following the first and second cam surfaces 106 and 108, respectively. A second cam follower 120 has a similar "V" configuration including two linkages 122 and 124, which are shorter than linkages 110 and 112, with its apex pivotally coupled to the second lens group at 126 and its terminal ends pivotally coupled to the terminal ends of the first cam link 116 and 118.

Figure 6:
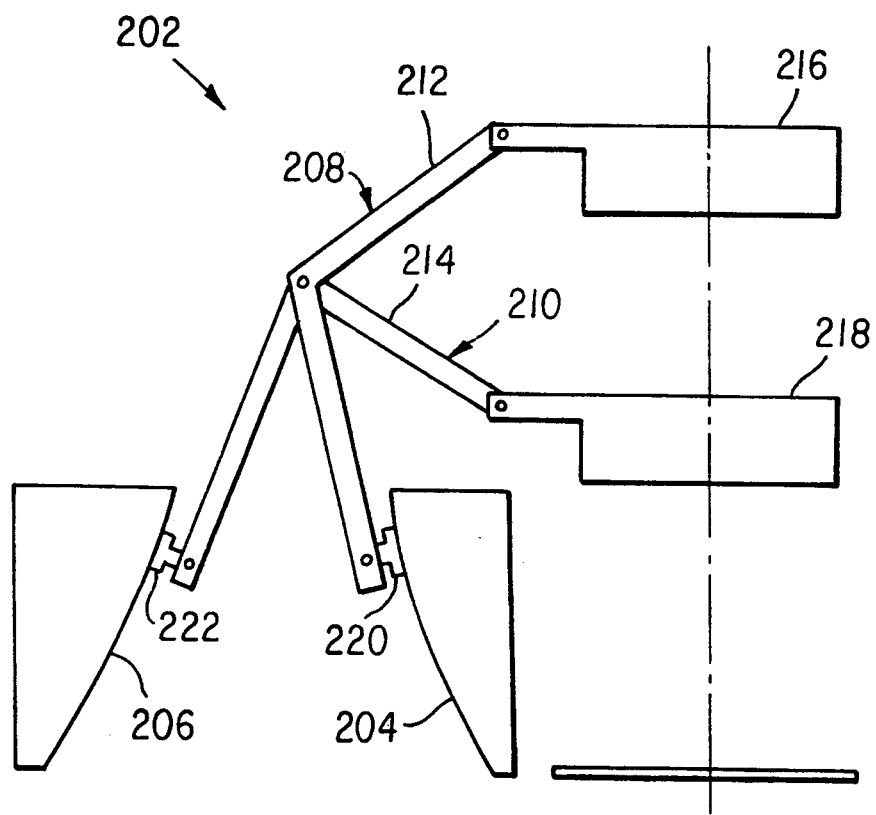

FIG. 6 depicts a second alternate embodiment including a control 202 having separated cams 204 and 206 with an open space there between for accommodating the followers 208 and 210. In most other respects, this embodiment is similar to the preferred embodiment and includes first and second L-shaped scissors links 212 and 214 extending from one end pivotally coupled to the first and second lens groups 216 and 218, respectively, to an opposite end where they engage and follow first and second cam followers 220 and 222.

It will be now appreciated that there has been presented an improved control for a multi-focal optical system that retains the simplicity of cam and follower mechanisms while removing their previous sensitivity to certain tolerances. Contrary to prior art devices that magnified the deleterious effects of lateral lens movement normal to the optical axis, the present invention cancels such deleterious effects, permitting significantly relaxed tolerances and reduced cost with superior results.

As is evident from the foregoing description, certain aspects of the invention are not limited to the particular details of the examples illustrated, and it is therefore contemplated that other modifications and applications will occur to those skilled in the art without departing from the invention. It is accordingly intended that the claims shall cover all such modifications and applications as do not depart from the true spirit and scope of the invention.

What is claimed is:

1. An optical system including a plurality of optical elements disposed along an optical axis, and means for moving said optical elements along the optical axis relative to each other, thereby to vary the focal length of said optical system, characterized in that:

said moving means includes compensating means for maintaining the focal length constant upon lateral displacement of at least one of said optical elements in a direction substantially perpendicular to said optical axis, wherein said optical elements include first and second lens groups moveable along said optical axis, and first and second linkage means coupled, respectively, to said first and second lens groups for displacing said second lens group relative to said first lens group in response to movement of said first lens group along said optical axis; and, wherein said compensating means includes means for causing said first and second linkage means to move proportionally in opposite directions relative to each other to maintain the focal length of said optical system constant when at least one of said lens groups is displaced laterally in a direction substantially perpendicular to said optical axis.

2. An optical system as defined in claim 1, wherein said causing means includes cam means having a first cam surface and a second cam surface for communicating motion to said first and second linkage means, respectively, first cam follower means coupled to said first linkage means for engaging said first cam surface, and second cam follower means coupled to said second linkage means for engaging said second cam surface to effect said proportional and opposite movement.

3. An optical system as defined in claim 2, wherein said first and second cam surfaces are defined by opposite edges of a single cam plate, said first linkage means is a first L-shaped member having one end pivotally mounted to said first lens group and another end pivotally mounted to said first cam follower means; and said second linkage means is a second L-shaped member having one end coupled to said second lens group and another end coupled to said second cam follower means, said second L-shaped member being pivotally mounted to said first L-shaped member to effect said proportional movement.

4. An optical system as defined in claim 3, wherein said second L-shaped member is mounted to said second lens group for pivotal and translational movement.

5. An optical system as defined in claim 2, wherein said cam means includes a first cam having a first cam surface and a second cam having a second cam surface, said first linkage means includes a first L-shaped member having one end pivotally mounted to said first lens group and another end pivotally mounted to said first cam follower means; and said second linkage means includes a second L-shaped member having one end pivotally mounted to said second lens group and another end pivotally mounted to said second cam follower means, said second L-shaped member being pivotally mounted to said first L-shaped member to effect said proportional and opposite movement of said first linkage means and said second linkage means.

6. An optical system as defined in claim 5, wherein said second L-shaped member is mounted to said second lens group for pivotal and translational movement.

7. An optical system as defined in claim 1, wherein said causing means includes cam means having a first cam surface and a second cam surface for communicating motion to said first and second linkage means respectively, first cam follower means coupled to said first and second linkage means for engaging said first cam surface, and second cam follower means coupled to said first and second linkage means for engaging said second cam surface to effect said proportional and opposite movement of said first and second linkage means.

8. An optical system as defined in claim 7, wherein said cam means includes a single plate having first and second cam surfaces, said first linkage means includes a first member having one end pivotally connected to said first lens group and another end pivotally connected to said first cam follower means and a second member having one end pivotally connected to said first lens group and another end pivotally connected to said second cam follower means; and said second linkage means includes a third member having one end connected to said second lens group and another end connected to said first cam follower means and a fourth member having one end pivotally connected to said second lens group and another end pivotally connected to said second cam follower means to effect said proportional and opposite movement of said first linkage means and said second linkage means.

9. An optical system including first and second lens groups disposed for relative movement along an optical axis and coupled by a cam and follower mechanism for controlling such relative movement to change the focal length of the optical system, characterized in that:

the cam includes a face engaged by the follower, and said cam and follower mechanism includes means for offsetting relative movement between the lens groups along the optical axis caused by lateral movement of said lens groups essentially normal to said cam face, thereby to maintain the focal length constant in the presence of said lateral movement.

10. An optical system as defined in claim 9, wherein said offsetting means includes first and second opposed cam faces and first and second scissors links, said first scissors link extending between said first lens group and said first cam face, said second scissors link extending between said second lens group and said second cam face, and a floating pivot coupling said first scissors link to said second scissors link.

* * * * *